(12) United States Patent
Kimmell (10) Patent No.: US 7,392,822 B2
(45) Date of Patent: Jul. 1, 2008

(54) LIQUID LEVEL CONTROLLER AND PILOT SWITCH

(75) Inventor: Garman Oscar Kimmell, Oklahoma City, OK (US)

(73) Assignee: Kimray, Inc., Oklahoma City, OK (US)

( * ) Notice: Subject to any disclaimer, the term of this patent is extended or adjusted under 35 U.S.C. 154(b) by 312 days.

(21) Appl. No.: 11/409,751

(22) Filed: Apr. 24, 2006

(65) Prior Publication Data

US 2007/0246101 A1    Oct. 25, 2007

(51) Int. Cl.
*F16K 31/18* (2006.01)
(52) U.S. Cl. .................. 137/415; 137/413; 137/426; 137/434
(58) Field of Classification Search ............... 137/415, 137/413, 412, 426, 434, 428, 445
See application file for complete search history.

(56) References Cited

U.S. PATENT DOCUMENTS

| 3,052,254 | A | * | 9/1962 | Parks ........................ 137/414 |
| 4,543,973 | A | * | 10/1985 | Ho ............................. 137/413 |
| 4,974,625 | A | | 12/1990 | Paullus et al. |
| 5,992,448 | A | | 11/1999 | Anderson et al. |
| 6,240,955 | B1 | | 6/2001 | Anderson et al. |

* cited by examiner

*Primary Examiner*—Kevin L Lee
(74) *Attorney, Agent, or Firm*—McAfee & Taft (57) ABSTRACT

A liquid level controller including a pilot valve switchable between snap and throttle modes. A displacer translates changing liquid level in a tank into movement that is transferred to the pilot valve which will provide output gas to a control valve to allow or to prevent the discharge of fluid from the tank. The pilot valve has a throttle supply inlet and a snap supply inlet and a single output passage. When the pilot valve is in the throttle mode, the snap supply inlet is a vent passage and when the pilot valve is in the snap mode, the throttle supply gas inlet is a vent passage.

22 Claims, 8 Drawing Sheets

LIQUID LEVEL CONTROLLER AND PILOT SWITCH

BACKGROUND OF THE INVENTION

The present invention relates generally to a pilot valve and more specifically to a pilot valve that is selectively switchable between modes of operation.

For example, as is known in the art, pilot valves are used in a number of different industries, typically to control process conditions or parameters, by controlling the operation of a process control unit, such as a process control valve. Numerous industries utilize process control valves to control the rate of flow of liquid and to control the level of liquid in tanks and vessels. The process control valves in many cases are operated with a control signal, which may be, for example, a pneumatic signal transmitted from a pilot valve. In such a case, the liquid level in a tank or other vessel may be sensed with a float or other element which moves when the liquid reaches a certain level. Movement of the float will actuate a control device, such as a pilot valve, which will send a signal to the process control valve to open or close the process control valve to either allow flow of liquid from the vessel or to prevent flow therefrom.

In the oil and gas industry, liquid level controllers may be used to control the level of oil, water or other liquids in a tank or other vessel. Liquid level controllers may include a float, or displacer placed inside the tank. When the liquid level in the tank is such that it engages the displacer, the displacer will move as the level of the liquid changes. The changes in the liquid level are transmitted to a pilot valve which will signal the process control valve to either open or close in response to the changing liquid level in the tank which will either allow flow or stop flow from the tank.

The pilot valve may be a pneumatic pilot valve to which a supply gas is provided. The pilot valve will direct the supply gas to the process control valve depending upon the level of liquid in the tank and the process control valve will open or close depending on the signal received from the pilot valve. When the process control valve is a pressure to open valve, the pilot valve will modulate output gas to the control valve which will open the control valve. Liquid level controllers may be referred to as direct and throttle in operation if an increase in the level in the tank results in a proportional increase in outlet pressure from the pilot valve to the process control valve. In such a case the process control valve may move from closed to partially open and ultimately to fully open or anywhere in between the fully open and fully closed positions since the gas pressure supplied to the process control valve from the pilot valve will vary.

When the pilot valve is in snap mode, the pilot valve provides a sudden increase in output pressure, or a sudden decrease to the process control valve so that the control valve will open fully, or close fully, almost immediately. For example, in a direct snap mode, when the level of liquid in the tank increases and moves the float to a predetermined level, there will be a sudden increase in output pressure from the pilot valve which will cause the pressure to open process control valve to move almost immediately from the fully closed to a fully open position to discharge liquid from the tank. When the liquid level falls to a preselected lowermost level, a sudden decrease in output pressure from the pilot valve will occur, which will cause the process control valve to move from the fully open to the fully closed position.

Liquid level controllers are available both in throttle and snap and there is some art that discusses pilot valves that are convertible from the snap to the throttle modes with connection changes, and other modifications. However, those devices may require excessive manipulation in order to change from snap to direct and vice versa, which can be time-consuming and undesirable. Thus, there is a need for a liquid level controller that includes a pilot switch or pilot valve that is selectively switchable quickly and efficiently from a snap to a throttle mode and that can be adjusted to desired sensitivities.

SUMMARY OF THE INVENTION

The current invention is directed to a pilot valve and more specifically to a pilot valve or pilot switch that is selectively switchable between throttle and snap modes.

The pilot valve of the current invention is described in connection with a liquid level controller. The pilot valve may be used in other environments, however, where the measured parameter is something other than liquid level. The pilot valve can, based on the magnitude of a measured parameter, send a pneumatic signal to a process control unit to regulate a process, or to cause a notification or alarm based on the state of the measured parameter.

The pilot valve of the current invention includes a pilot body which has a first, or throttle supply gas inlet, a second, or snap supply gas inlet and a single gas output passage. Supply gas entering either of the supply gas inlets that exits through the gas output passage may be referred to as output gas, which is preferably a modulated output gas, and creates output pressure to the process control unit. In the current embodiment, the process control, or receiving unit, may comprise a process control valve which controls the discharge of liquid from a vessel. The pilot valve is selectively switchable between throttle and snap modes and is preferably switchable simply by rotating a switch plate which will selectively direct supply gas to either the throttle supply gas inlet or the snap supply gas inlet. When the pilot valve is in snap mode, the throttle gas inlet acts as a vent passage. In the throttle mode, the snap supply gas inlet acts as a vent passage. The pilot body defines a pilot body interior through which supply gas may pass from the snap supply inlet or the throttle supply inlet to the output passage, also referred to as the modulated gas outlet or simply the output gas outlet.

A pilot plug is movably disposed in the pilot body interior and has first and second sealing elements connected to one another by a pilot plug stem. The first sealing element, which may be referred to as a first sealing ball, and the second sealing element, which may be referred to as the second sealing ball are movable and engageable with first and second seats in the pilot body interior. A movable actuator is disposed in the pilot body interior, and has a first end and a second end wherein the second end extends outwardly to an exterior of the pilot body. The liquid level controller includes a displacer positioned inside a tank or vessel. A waggle arm is connected at one end to the displacer and has a second end that engages an end of a pivot rod. The vertical or up-and-down movement of the displacer will cause the second end of the waggle arm to move. The second end of the waggle arm will move in the direction opposite the direction of movement of the displacer and first end of the waggle arm. A connecting link, which is preferably a variable length connecting link will translate the up-and-down movement of the waggle arm to a tangent arm. The tangent arm will transmit the changes in the liquid level, or other sensed parameter, to the pilot valve.

The connecting link may be connected to the tangent arm on a first or left side relative to a pivot point of the tangent arm or a second or right side thereof. The tangent arm is connected at the pivot point to a liquid level controller housing and is engageable with the end of the movable actuator. In the current embodiment, the tangent arm engages the actuator on the second side of the pivot point. When the connecting link is connected on the first side of the pivot point, upward movement of the connecting link will cause the tangent arm to move downwardly on the right side thereof so that it will disengage and move away from the actuator. Downward movement of the connecting link will cause pivoting motion of the tangent arm which will cause the tangent arm to move upwardly to engage the actuator and move the actuator upwardly. When the connecting link is connected on the second side of the pivot point, upward movement of the connecting link will cause the tangent arm to engage and move the actuator upwardly while downward movement of the connecting link will cause the tangent arm to disengage and move away from the actuator.

Thus, the tangent arm will engage and move the actuator or disengage from the actuator depending upon the liquid level and the mode of the pilot valve. Movement of the actuator and other components will open and/or close passages to either supply or shut off output gas to the process control valve as will be described in more detail herein. Additional objects, features and advantages are apparent in the written description which follows.

BRIEF DESCRIPTION OF THE DRAWINGS

FIG. 10 shows a top partial section view showing passageways for supply and vent gas.

FIG. 11 is a partial section view of a selector switch showing the passageways for supply and vent gas.

DETAILED DESCRIPTION OF A PREFERRED EMBODIMENT

Figure 2:
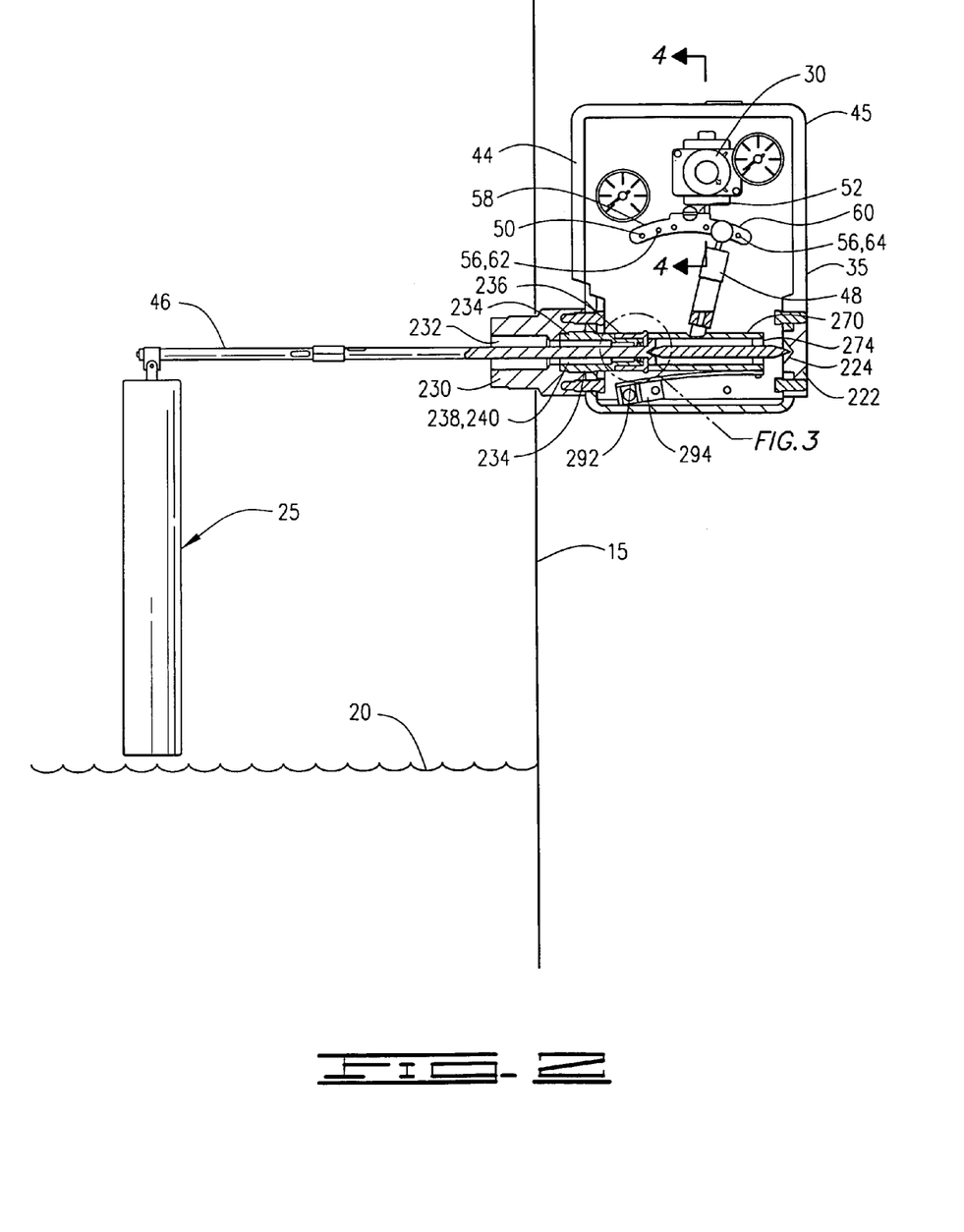
FIG. 2 shows a partial cross section of the housing and shows the internal components of the liquid level controller and schematically shows the side of a vessel or tank with a displacer in the tank.
Figure 3:
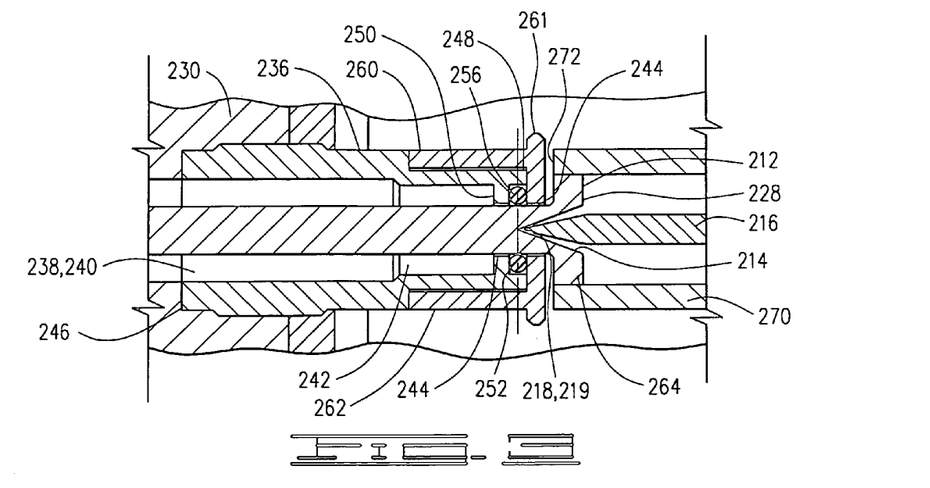
FIG. 3 is an enlarged view of portion 3 of FIG. 2.
Figure 4:
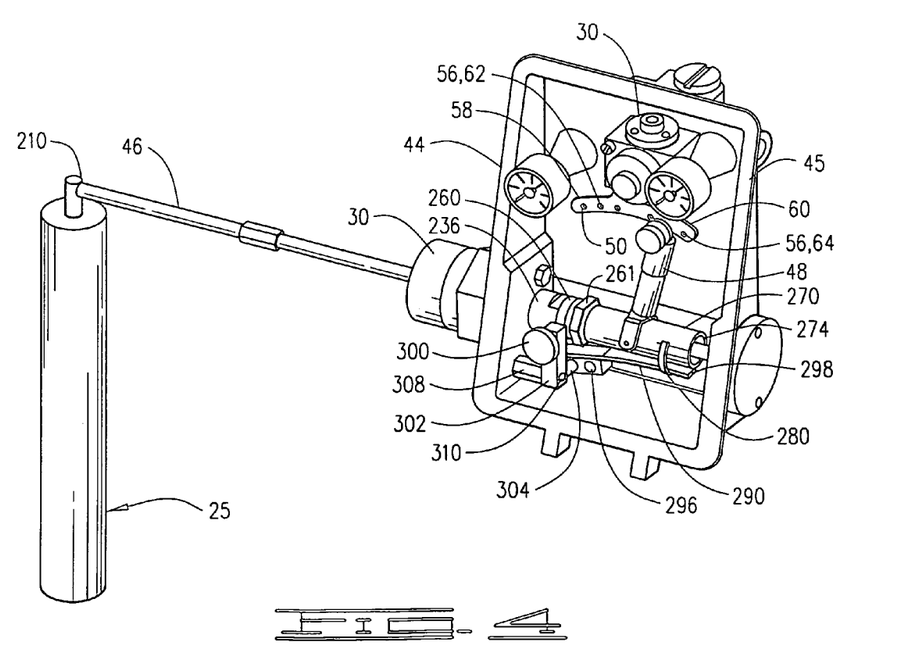
FIG. 4 is a perspective view showing the inside of the liquid level controller housing.

Referring now to the drawings, liquid level controller 10 is shown and described. Liquid level controller 10 is shown in FIG. 2 adjacent the side of a tank 15 with a liquid level 20. In the embodiment shown, liquid level controller 10 is a side-mounted liquid level controller but other configurations are possible. Liquid level controller 10 includes a displacer 25 and a pilot switch or pilot valve 30 disposed in a housing 35. Housing 35 has a removable front panel 40, a rear panel 42 and left and right sides 44 and 45, respectively. A waggle arm 46 and a connecting link assembly 48 which may be a variable length connecting link assembly are utilized to connect displacer 25 to a tangent arm 50 such that movement of displacer 25 will move tangent arm 50. Tangent arm 50, which may be referred to as an actuator arm, is pivotally attached to housing 35 and in the embodiment shown is pivotally attached to rear panel 42 at a pivot point 52.

Vertical movement of displacer 25 caused by a changing level 20 of the liquid in tank 15 will cause movement of connecting link assembly 48. As is apparent in FIG. 2, tangent arm 50 has a plurality of connecting points 56. When viewed from the direction shown in FIG. 2, tangent arm 50 has a plurality of connecting points 56 on the left or first side 58 of pivot point 52 and a plurality of connecting points on the right or second side 60 of pivot point 52. Connecting points 56 on the left side 58 may be referred to as connecting points 62 and the right side connecting points may be referred to as connecting points 64.

Figure 5:
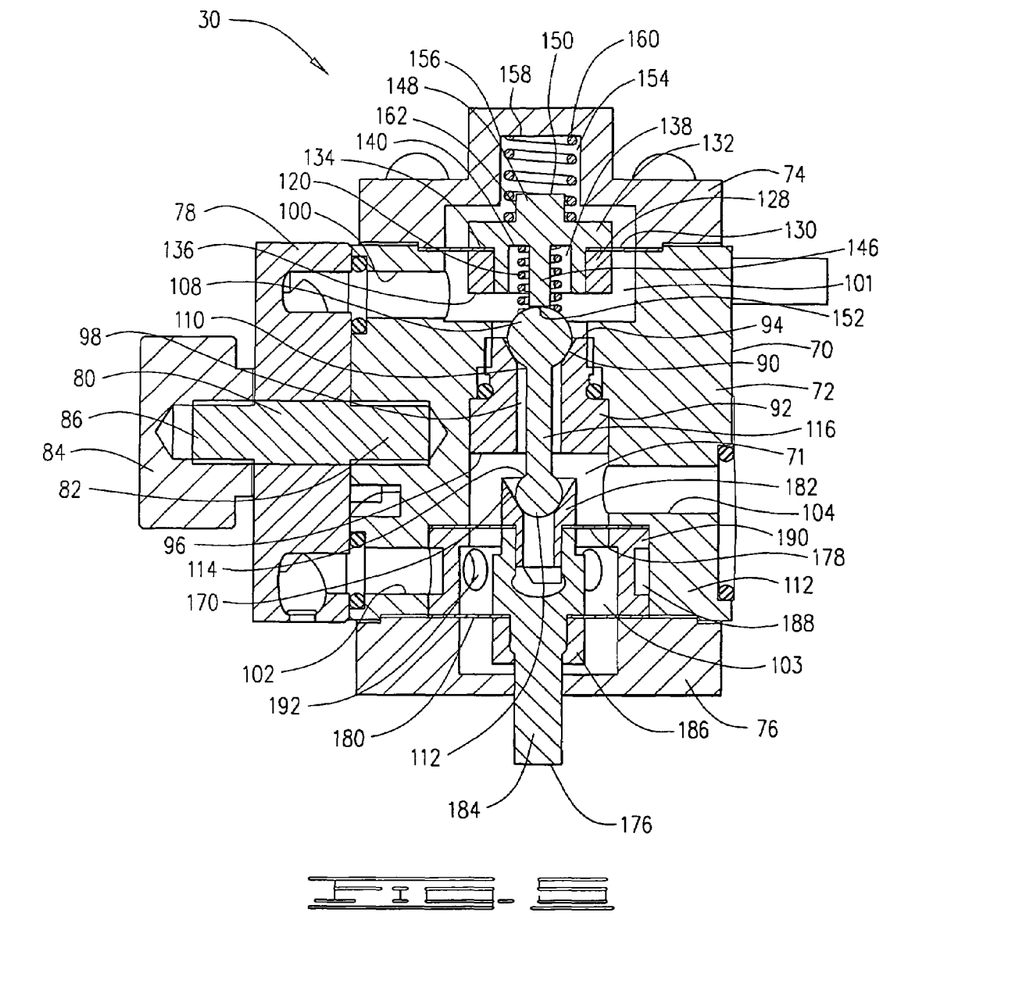
FIG. 5 is a cross-section view taken from lines 4-4 of FIG. 2.

Details of the pilot valve will be described with reference to FIGS. 5-13. FIG. 5 is a cross section of pilot switch 30 taken from line 4-4 of FIG. 2. Pilot valve 30 comprises a pilot body 70 which defines pilot body interior 71. Pilot body 70 may include central body portion 72 and upper or cap portion 74 connected thereto with connectors, such as screws, or other means known in the art and a lower portion or base portion 76 which may be connected with screws or other connectors, or otherwise connected to central body portion 72. A selector knob 78, which may also be referred to as a switch plate, having outer surface 79 is mounted to pilot body 70 with a post 80 which may be threaded into pilot body 70 at a first end 82 thereof and may have a lock nut or other locking means 84 threaded to the opposite end 86 thereof.

The pilot body has first seat 90 which may be referred to as first seat 90 or upper seat 90. First seat 90 may be defined on a seat body 92 at an upper end 94 thereof. Seat body 92 may be threaded or otherwise fixed in pilot body interior 71. Seat body 92 has lower end 96 and defines a passageway 98 therethrough. Pilot body 70 defines a first supply gas inlet 100 and a second supply gas inlet 102 and defines a single gas outlet 104 for providing output gas to a process control valve (not shown). First supply gas inlet 100 may be referred to as the throttle supply gas inlet and second supply gas inlet 102 may be referred to as the snap supply gas inlet. As will be explained in more detail hereinbelow, selector knob 78 may be utilized to selectively direct supply gas to either of the first or second supply gas inlets 100 and 102, the first gas inlet 100 being the throttle supply gas inlet and the second gas inlet 102 being the snap supply gas inlet. Both of supply gas inlets 100 and 102 are configured to direct supply gas into pilot body interior 71 when selector knob 78 is rotated to direct supply gas into one of inlets 100 and 102. Pilot valve 30 is selectively switchable between snap and throttle modes with selector knob 78. No connection changes or other modifications are required to change between snap and throttle modes. All that is required is rotation of selector knob 78. In the throttle mode, supply gas is directed to first or throttle supply gas inlet 100 while in the snap mode, supply gas is directed through second or snap supply gas inlet 102. Throttle supply gas inlet 100 will direct supply gas into throttle chamber 101, and snap supply gas inlet will direct supply gas into snap chamber 103.

Throttle mode as it is referred to herein means that increases and decreases in the liquid level in the tank result in proportional increases or decreases in output gas, or output pressure to the process control valve from pilot valve 30. Because the increases and decreases in output pressure are proportional, the process control valve may be moved to partially open positions, and may be positioned anywhere between fully open and fully closed positions so that the flow rate out of the vessel changes with changes in output pressure.

With the pressure to open process control valve described in the current embodiment, in direct snap mode output pressure from the pilot valve 30 is increased suddenly when the level in the tank increases to the preselected uppermost level, which will cause the process control valve to open suddenly. The output pressure will be shut off suddenly when the liquid level in the tank reaches a selected lowermost level. The snap and throttle modes described herein are "direct" connected, which means that output pressure increases in response to the liquid level increase. The process control valve in such cases is designed to open in response to pressure. The liquid level controller can be configured to be connected "indirect," in which case output pressure from the pilot valve 30 increases when liquid level decreases, and output pressure from the pilot valve decreases when liquid level increases. The process control valve in such cases is designed to close as a result of the output pressure.

A pilot plug 106 is disposed in pilot body interior 71 and is movable therein. Pilot plug 106 has a first sealing ball or first sealing plug 108 at the upper or first end 110 thereof and has a second or lower sealing plug which may be referred to as a lower sealing ball 112 at the second or lower end 114 thereof. Plugs 108 and 112 may be referred to as first and second sealing elements 108 and 112, respectively, and are connected with a pilot plug stem 116.

A throttle spring 120 is positioned to engage first plug 108. Throttle spring 120 has first or upper end 122 and second or lower end 124. A spring plate 126 is pressed, or otherwise fixed in a spring sleeve 128 in pilot body interior 71. A diaphragm 130, which may be referred to as a spring diaphragm 130 is captured between a shoulder 132 of spring plate 126 and an upper end 134 of spring sleeve 128 which also has lower end 136. Spring diaphragm 130 is also captured between upper portion 74 and central body portion 72 of pilot body 70. Spring diaphragm 130 is preferably made from an elastomer, a Teflon-type material, or other material that will move or flex.

Spring plate 126 defines a spring cavity 138 in which at least a portion of throttle spring 120 is housed. An upper end 140 of spring cavity 138 is engaged by upper end 122 of throttle spring 120. Lower end 124 of throttle spring 120 engages first plug 108 and applies force thereto in a direction to urge first plug 108 toward and into engagement with first seat 90, which is the downward direction in the embodiment shown in the drawings. A push rod 142, which may be integrally formed with spring diaphragm plate 126 comprises a vertical leg 146. A spring guide 148 is formed on spring diaphragm plate 126. Spring diaphragm plate 126 has upper or first end 150 and second or lower end 152 which is also the end of push rod 142. A snap spring 154 is positioned to engage spring diaphragm plate 126 and is positioned in a snap spring cavity 156 which comprises a portion of pilot body interior 71. Snap spring cavity 156 has an upper end 158 which is defined by cap portion 74. An upper end 160 of snap spring 154 engages upper end 158 of snap spring cavity 156 and in the position shown in FIG. 5, a lower end 162 of snap spring 154 engages spring diaphragm plate 126 and is disposed about spring guide 148. Snap spring 154 thus engages and applies a downwardly directed force to spring plate 126.

When push rod 142 is engaged with upper sealing ball 108, snap spring 154 will apply a force thereto in a direction to urge sealing ball 108 toward and into engagement with first seat 90. The force applied to pilot plug 106 therefore is the combined force of snap spring 154 and throttle spring 120 when the pilot valve is in snap mode, shown in FIGS. 6 and 7, and the springs, which may be referred to as first and second springs 120 and 154, may be identified as a biasing means for urging sealing ball 108 toward and into engagement with first seat 90. In throttle mode, shown in FIGS. 8 and 9, only first spring 120 acts on first sealing ball 108, and the force applied by snap spring 154 is counteracted by supply gas pressure from throttle supply inlet 100 acting on spring diaphragm 130, which flexes spring diaphragm 130 upwardly so that push rod 142 is disengaged from first sealing ball 108. The biasing means may therefore be referred to as a variable force biasing means, since the force applied to the pilot plut will vary depending on the mode in which the pilot is operating. When pilot valve 30 is in snap mode, the biasing means, also referred to as a loading means or loading mechanism, applies sufficient force to maintain the first sealing ball 108 in engagement with first seat 90. In throttle mode, the force applied by the biasing means changes. In throttle mode, supply gas passing through first supply inlet 100 will act upon spring diaphragm 130, and will counteract at least a portion of the force applied by the biasing means. Preferably, supply gas passing through first supply inlet 100 will act upon spring diaphragm 130 to completely counteract the force applied by snap spring 154 and disengage. Thus, in snap mode, a first, or maximum force is applied to the pilot plug, and in throttle mode a second, decreased force is applied to the pilot plug. The pilot valve is bistable in snap mode, meaning that the pilot plug is stable when it is positioned to prevent supply gas from passing through the gas outlet, and is stable when it is positioned to allow full flow of supply gas through the pilot valve. The pilot plug 106 will move between the fully open or fully closed positions instantaneously, and is not stable anywhere therebetween.

A second or lower seat 170 is defined on an actuator 172 which is movably disposed in pilot body interior 71. Actuator 172 has a first or upper end 174 and second or lower end 176. Actuator 172 is mounted to pilot body 70 with a pair of actuator diaphragms 177 comprising first or upper actuator diaphragm 178 and second or lower diaphragm 180. Diaphragms 178 and 180 are preferably made from an elastomer, or Teflon-type material, or other material that will move or flex so that actuator 172 is movable in pilot body interior 71. As is apparent from the drawings, lower end 176 extends through pilot body 70 so that it may be engaged by tangent arm 50.

Actuator 172 may comprise a three-piece actuator including an upper portion 182, which may be pressed in, or otherwise fixed to actuator body portion 184, which in turn may be pressed in, or otherwise fixed to actuator sleeve 186. Lower actuator diaphragm 180 is captured between actuator sleeve 186 and actuator body portion 184 while upper actuator diaphragm 178 is captured between upper portion 182 of actuator 172 and body portion 184. A generally circular groove 188 is defined by central body portion 72 of pilot body 70 and lower or base portion 76. A spacer 190 is positioned in groove 188 and holds upper and lower actuator diaphragms 178 and 180 in place. Spacer 190 has a plurality of openings 192 therethrough so that pilot body interior 71 is communicated with second supply gas inlet 102 therethrough. Supply gas is communicated through openings 191 in actuator 172.

Figure 9:
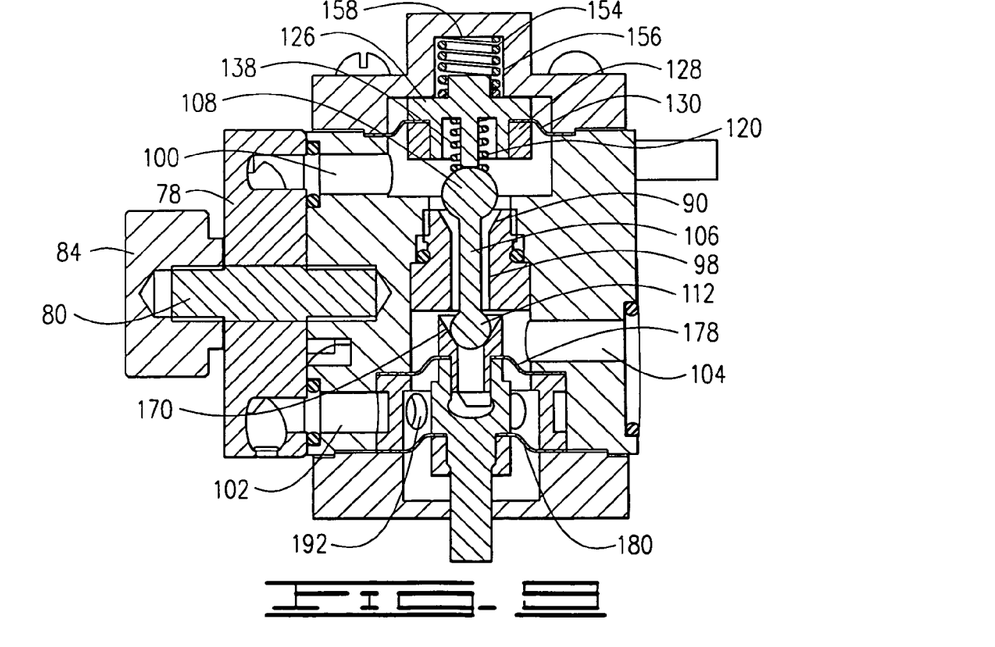
FIG. 9 shows the position of the actuator and the pilot plug when fluid has risen such that the displacer will cause the actuator to move upwardly and thus move the pilot plug upwardly to the position shown.

FIG. 9 is a section view which shows a supply passage 194 and a vent passage 196 through pilot body 70. Housing 35 may be configured so that supply gas is provided to supply passage 194 from a passageway 195(a) in housing 35. Passageway 195(a) will receive supply gas from one of supply entrances 197(a) and 197(b) so that a gas line can be connected to the rear or side of housing 35. The supply entrance that is not being used will be plugged. Gas is vented through vent passage 196 into a passageway 195(b), and from passageway 195(b) through one or both of vent gas exits 193(a) and 193(b), so that gas may be vented through the side, or the rear of housing 35.

Figure 12:
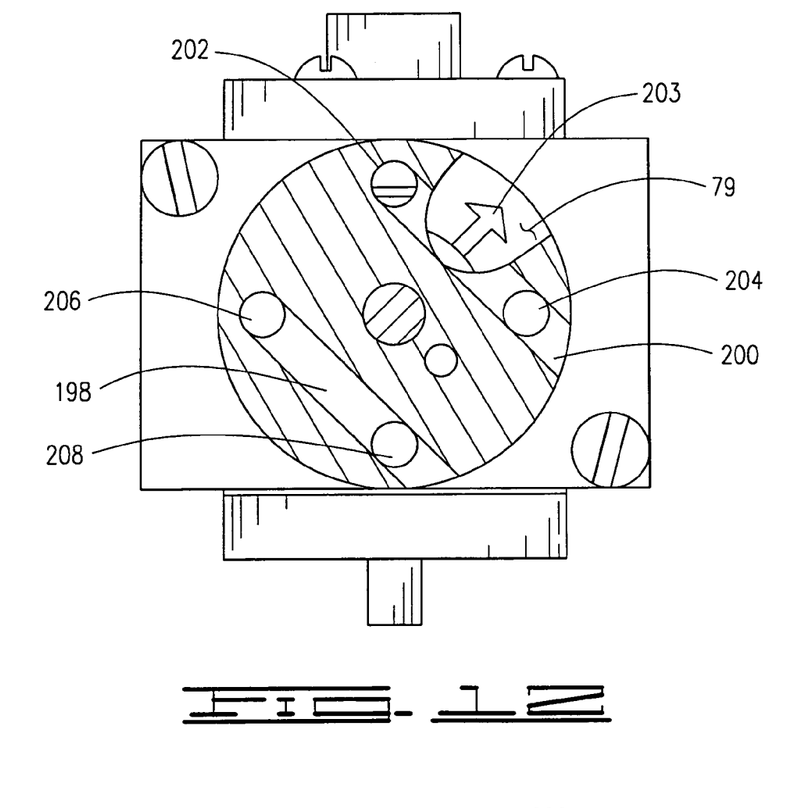
FIG. 12 is a view similar to FIG. 10 in a different mode.
Figure 13:
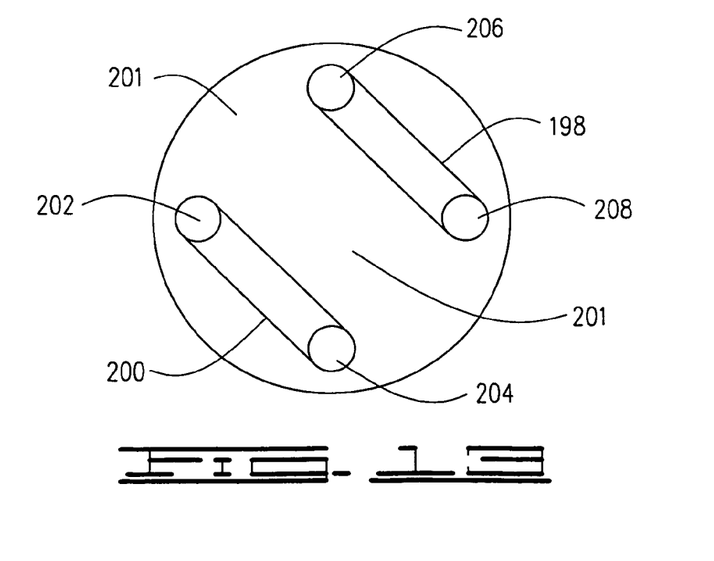
FIG. 13 is a view looking at the inner surface of a switch plate.

As shown in FIGS. 11 and 12 switch plate grooves 198 and 200 are defined on an interior surface 201 of switch plate 78. FIGS. 11 and 12 are views with a portion of switch plate 78 cut away to show grooves 198 and 200. The arrow 203 may be imprinted or otherwise applied to the outer surface 79 of switch plate 78. Groove 200 has openings 202 and 204 at the ends thereof while groove 198 has openings 206 and 208 at the ends thereof.

When switch plate 78 is rotated to the snap mode (FIG. 11 in the embodiment shown), gas supplied to supply passage 194 passes into opening 202 and is communicated through groove 200 and opening 204 into snap supply inlet 102. Vent passage 196 is communicated with opening 208 and thus is communicated with throttle supply inlet 100 through groove 198 and opening 206. In throttle mode, the knob is rotated to the position shown in FIG. 12 so that opening 204 is communicated with supply passage 194 which communicates supply gas through groove 200 into opening 202 and throttle supply inlet 100. In the throttle mode, opening 206 is communicated with vent passage 196 which is communicated with snap supply gas inlet 102 through groove 198 and opening 208.

Figure 7:
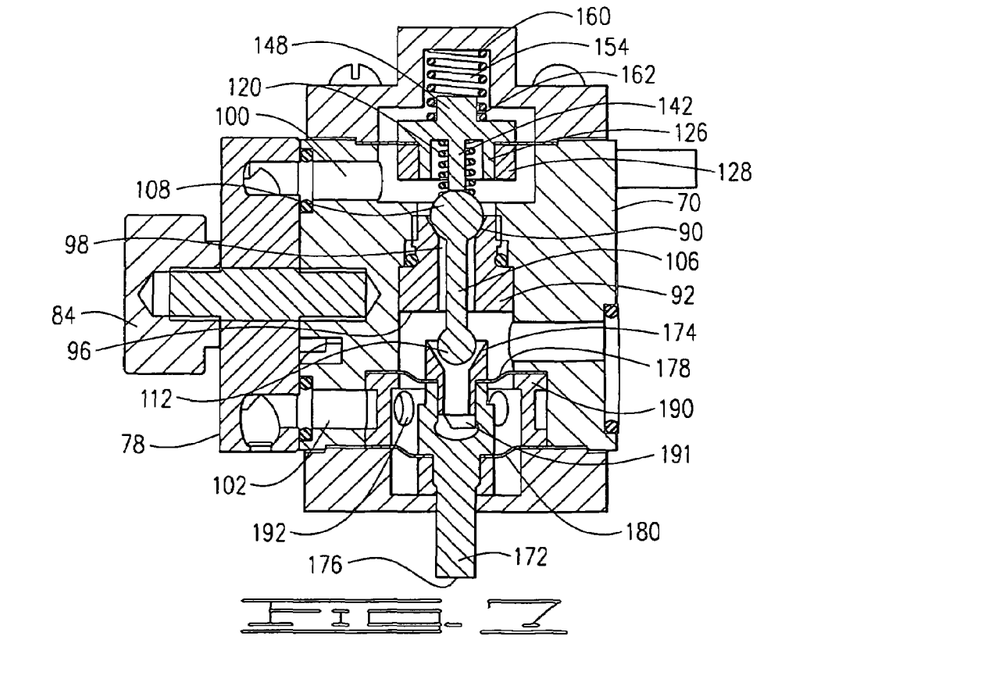
FIG. 7 shows the position of the pilot plug in the actuator when the force from the displacer has reached the snap-on point.

When switch plate 78 is rotated so that the pilot valve is in throttle mode, supply gas passes through first gas supply inlet 100 into pilot body interior 71. Supply gas passing through throttle supply inlet 100 will have sufficient pressure to deform spring diaphragm 130 slightly so that it counteracts the downward force acting on push rod 142 by snap spring 154. Throttle spring 120 will continue to apply a downward force to upper plug 108, and therefore to pilot plug 106. No other mechanical force, or manipulation is required to counteract the force applied by snap spring 154, other than the supply gas pressure applied when pilot valve 30 is in throttle mode. Therefore, when the pilot valve 30 is in throttle mode, with supply gas entering through throttle supply gas inlet 100, lower end 152 of push rod 142 will be spaced from upper sealing ball 108. Connecting link 48 will be connected to one of the connecting points 62 in tangent arm 50 on the left side of pivot point 52. FIG. 7 shows the relative positions of the components of pilot valve 30 when there is no liquid on displacer 25 or when the liquid contacting displacer 25 is not sufficient to move the displacer 25 sufficiently to move actuator 172 upwardly. As the liquid level rises in tank 15, displacer 25 will begin to move when the liquid is at a preselected level. As the displacer 25 moves upwardly, connecting link 48 will begin to move downward because of the pivoting motion of waggle arm 46 which will be explained in more detail hereinbelow. Tangent arm 50 will pivot about pivot point 52, so that right side 60 of tangent arm 50 will move upwardly and engage lower end 176 of actuator 172. Continued movement resulting from the rising liquid level will cause actuator 172 to move upwardly. As the level increases sufficiently, second seat 170 will engage lower plug 112.

Figure 8:
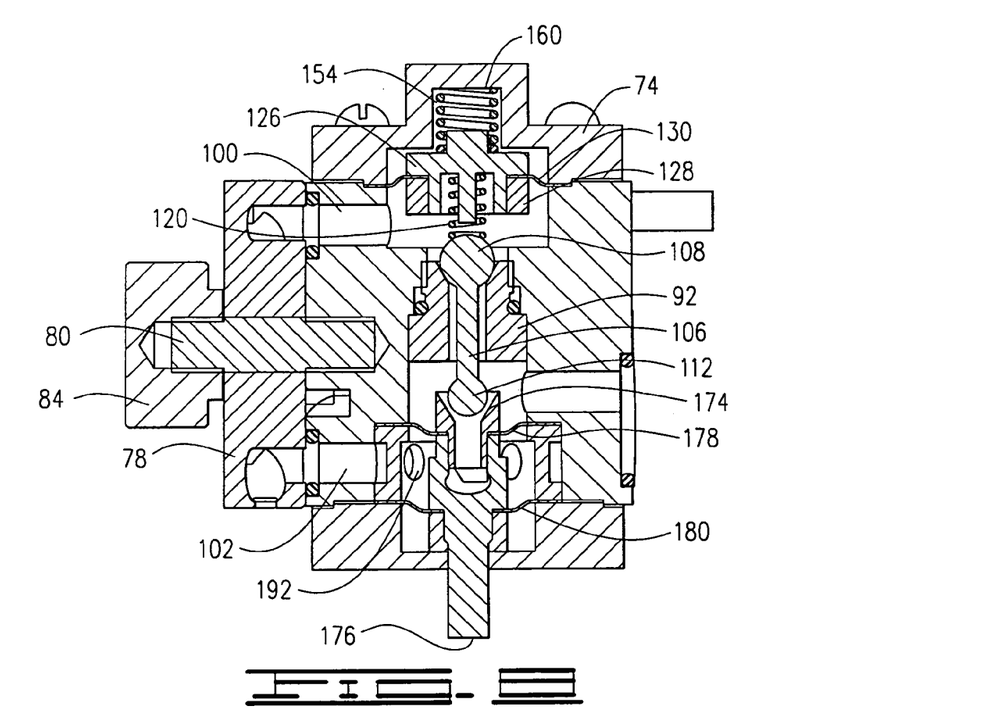
FIG. 8 shows the pilot valve with the pilot plug and actuator positioned in the throttle mode when there is not sufficient force from the displacer to cause upward movement of the actuator.

As the liquid level continues to increase in tank 15, second seat 170, which is engaged with the lower plug 112, will urge pilot plug 106 upwardly so that there is a space between upper plug 108 and first seat 90 as depicted in FIG. 8. Supply gas can then begin to flow from first supply gas inlet 100 through passageway 98 into and through gas outlet 104 which is communicated with the process control valve on tank 15. Output gas from gas outlet 104 will be at such a pressure to cause the pressure-operated process control valve to open so that liquid in tank 15 will begin to be discharged therethrough. As the liquid level in tank 15 continues to increase, the space between upper plug 108 and first seat 90 will increase and more output gas pressure is provided to the process control valve. Thus, in throttle mode, output gas is supplied proportionate to the liquid level increase, and the process control valve on tank 15 will open gradually depending on the amount of output gas communicated thereto and can be moved from fully closed to fully open or positioned therebetween. Supply gas will also continue to counteract the downward force applied by snap spring 154 by causing diaphragm 130 to flex upwardly. Once the amount of liquid entering tank 15 begins to slow such that the amount of liquid expelled through the process control valve exceeds that being flowed into the tank 15, the liquid level displacer 25 will drop which will cause a corresponding drop by actuator 172. As actuator 172 drops, first plug 108 will ultimately engage first seat 90, and the actuator 172 will move back to the position shown in FIG. 7. Gas in pilot body interior 71 will be vented through second supply gas inlet 102 into vent passage 196 which is communicated into vent outlets 193(a) and/or 193(b) and is vented to the atmosphere through housing 35.

Figure 6:
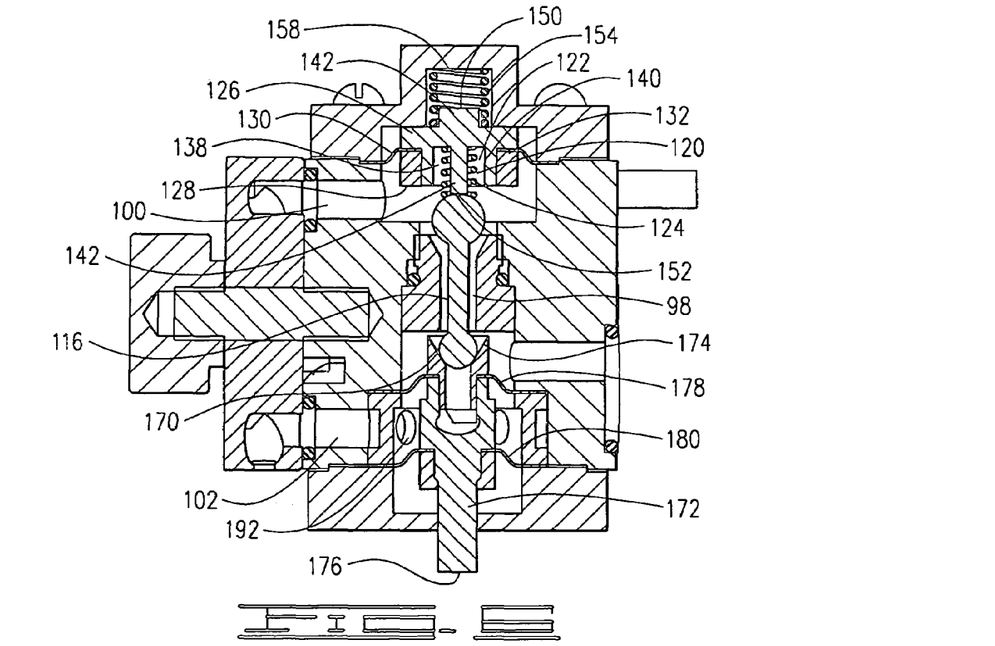
FIG. 6 is a section taken similar to FIG. 5 and shows the position of the pilot plug in snap mode when there is not sufficient liquid on the displacer to disengage the tangent arm from the actuator.

In snap mode, connecting link 48 is positioned so that it is connected to one of connecting points 64 on the right side of pivot point 52. When the level of liquid in tank 15 is such that it is not contacting displacer 25 sufficiently to move displacer 25 upwardly from a resting position, the position of the components of pilot valve 30 will be as shown in FIG. 6. When the liquid level rises such that displacer 25 begins to move upwardly, pivoting action of waggle arm 46 will cause connecting link 48 to move downwardly which will pull tangent arm 50 downwardly on the left side of pivot point 52. Actuator 172 will move downwardly with tangent arm 50 as the liquid level rises in tank 15. In snap mode, supply gas is being supplied through second supply gas inlet 102. Pressure is thus being applied to lower actuator diaphragm 180 and to upper actuator diaphragm 178. Because lower actuator diaphragm 180 has a greater surface area, a greater force is being applied thereto. The liquid level will ultimately increase so that actuator 172 moves downwardly and a space between lower seat 170 and lower plug 112 is created so that supply gas passes into actuator 172 and upwardly therethrough. Immediately, or almost immediately after this occurs the space between seat 170 and second plug 112 will increase because actuator 172 will snap downwardly due to the force applied to lower actuator diaphragm 180 and to the top surface of upper actuator diaphragm 178. The opening between seat 170 and lower plug 112 will allow full flow supply gas to pass therethrough. Preferably, the flow rate is a rate sufficient to fully open the process control valve almost immediately after seat 170 disengages lower plug 112. In other words, the rate at which gas passes therethrough in output port 104 will be essentially the same rate that gas is passing into supply inlet 102.

When fluid in tank 15 begins to decrease and actuator 172 begins to rise, actuator 172 will ultimately be raised so that it once again engages plug 112. At that point, supply gas from snap supply inlet 102 to gas outlet 104 is shut off. As the liquid level continues to decrease, a space will be created between first seat 90 and first plug 108, and gas may be vented through passage 196 and one of vent gas exits 193(a) and/or 193(b). Immediately, or almost immediately thereafter the process control valve will be fully closed so that no liquid can escape through the process control valve. If one of exits 193(*a*) or 193(*b*) is not being used, it will be plugged. In the snap mode, no supply gas is being communicated into pilot body interior 71 through first supply gas inlet 100. As such, snap spring 154 and throttle spring 120 will apply a downward force to pilot plug 106. Snap spring 154 urges push rod 142 downwardly which engages first plug 108 thereby applying a downward force to pilot plug 106. Upper plug 108 will stay fully engaged with first seat 90 when pilot valve 30 is in the position shown in FIG. 7, namely, snap mode where output pressure is being supplied to the process control valve from snap supply gas inlet 102 through gas outlet 104. Whether in the throttle or snap mode, gas is vented to the atmosphere when the liquid level falls to a level that moves the components of the pilot valve such that supply gas to the gas outlet 104 is blocked.

Figure 1:
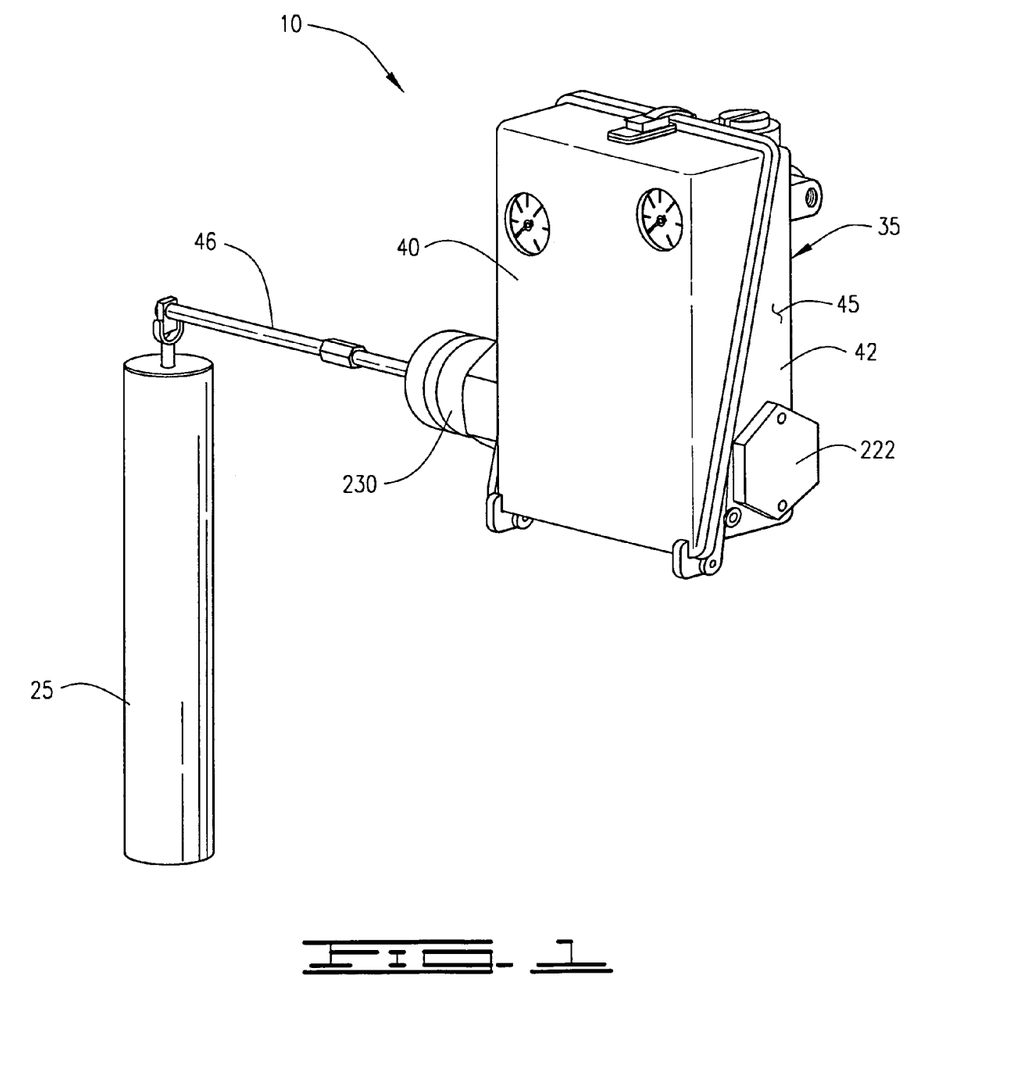
FIG. 1 is a perspective view of the liquid level controller of the current invention.

Referring now to FIGS. 1 and 2, waggle arm 46 has first end 210 connected to displacer 25 and has second end 212. Second end 212 may have a concavity 214 defined therein. A pivot rod 216 has first end 218 and second end 220 which may define pivot points 219 and 221, respectively. The pivot point 219 at first end 218 is received in concavity 214. A pivot plate 222 is mounted in housing 35 by threading or otherwise connecting thereto and includes a concavity 224. Pivot point 221 at the second end 220 of pivot rod 216 is received therein. A pivot ring 228 is defined at second end 212 of waggle arm 46, and concavity 214 is defined therein. A mounting piece 230 may be utilized to mount housing 35 to a tank 15 as schematically depicted in FIG. 2. Mounting piece 230 may be attached to housing 35 with screws or other fasteners that extend through housing 35 into the mounting piece 230. As is known, mounting piece 230 may be threaded into the vessel, which will have a threaded opening to receive mounting piece 230.

Mounting piece 230 has a stepped opening 232 through which waggle arm 46 is received, and has threaded interior 234 into which a connector 236 is threaded. Connector 236 has a stepped passageway 238 through which waggle arm 46 passes. Stepped passageway 238 is defined by a first stepped portion 240, a second stepped portion 242 radially inwardly therefrom and a third stepped portion 244 through which waggle arm 46 is received. Connector 236 has first end 246 and second end 248. A lip 250 extends inwardly from second stepped portion 242 to define third stepped portion 244, and defines a mounting flat 252 near second end 248 of connector 236. An O-ring 256 is positioned at second end 248 and a collar 260 threaded to connector 236. Collar 260 may have a hex head 261 to provide for threading, and has an outer surface 262.

Pivot ring 228 has an outer diameter 264 which is greater than the size of the opening in connector 236 through which waggle arm 46 passes. Pivot rod 216 is positioned in a waggle arm housing 270 which has first and second ends 272 and 274, and has outer diameter 276 and inner diameter 278 through which pivot rod 216 passes. Pivot ring 228 is positioned in waggle arm housing 270, and is closely received therein so that movement of second end 212 of waggle arm 46 causes movement of waggle arm housing 270. A bale or wire clip 280 is attached to waggle arm housing 270 at second end 274 thereof.

In operation, as liquid in a tank moves upwardly on displacer 25, first end 210 of waggle arm 46 will move upwardly, and waggle arm 46 will pivot about pivot point 219. Second end 212 of waggle arm 46 will move downwardly as a result of the pivoting motion, which will cause waggle arm housing 270 to move downwardly. Because connecting link 48 is attached to waggle arm housing 270, it will likewise move downwardly as displacer 25 moves upwardly. Waggle arm 46 and waggle arm housing 270 thus comprise a connecting arm for connecting the displacer 25 to connecting link 48. When connecting link 48 is attached to one of the connecting points 64 on the right side of pivot point 52, tangent arm 50 will move downwardly to allow second end 176 of actuator 172 to move down, and the pilot valve 30 and will operate in snap mode as hereinabove described. In throttle mode, connecting link 48 is attached to one of connecting points 62 on the left side of pivot point 52 and the left side of tangent arm 50 will be pulled downwardly as liquid causes displacer 25 to move upwardly. Tangent arm 50 will pivot about pivot point 52, and the right side of tangent arm 50 will move upwardly to push actuator 172 upwardly. Pilot valve 30 will operate in throttle mode as described hereinabove.

A counterbalance flat spring 290 is connected at a first end 292 to a mounting block 294. Mounting block 294 is pivotally attached to housing 35 with a pivot pin 296 or other connecting means that extends through mounting block 294 and is connected to housing 35 by threads or other known means. The second end 298 of counterbalance flat spring 290 is positioned in wire clip 286.

A control assembly includes a control knob 300 that is attached to and extends through a mounting bar 302. The control knob is threaded through mounting bar 302, and has an end that will engage outer surface 262 of collar 260. A control pin 304 extends from mounting bar 302 to mounting block 294. Mounting bar 302 may be attached to housing 35 through a post 308 with a pin 310 about which mounting bar 302 will pivot. Pin 310 will extend through mounting bar 302 and post 308, and may be threaded into a housing 35. Mounting bar 302 will pivot about pin 310. When the end of control knob 300 is engaged with outer surface 262 of collar 260, counterclockwise rotation of control knob 300 will cause the displacer to move upwardly. The counterclockwise rotation of control knob 300 causes mounting bar 302 to pivot about pin 304 so that it causes end 292 of counterbalance spring 290 to move upwardly, as mounting block 294 pivots about pin 296. Second end 298 pulls wire clip 280 downwardly, and thus pulls waggle arm housing 270 downwardly. Second end 212 of waggle arm 46 is pulled downwardly, and the pivoting motion of the waggle arm causes displacer 45 to move upwardly. Rotation of control knob 300 in the clockwise direction works oppositely. The spring 290 thus counterbalances the displacer, and allows the displacer to be set at a desired location such that it will move when liquid reaches a preselected level in a vessel.

Thus it is seen that the present invention is well adapted to carry out the objects and attain the ends and advantages mentioned above as well as those inherent therein. While certain preferred embodiments of the invention have been described for the purpose of this disclosure, numerous changes in the construction and arrangement of parts and the performance of steps can be made by those skilled in the art, which changes are encompassed within the scope and spirit of this invention as defined by the appended claims.

What is claimed is:

1. A pilot assembly switchable between a throttle mode and a snap mode comprising:
 a pilot body having a throttle supply gas inlet, a snap supply gas inlet and a single output gas outlet for providing output gas to a process control component;
 a pilot plug in a pilot body interior, the pilot plug having a first sealing element engageable with a first seat, and a second sealing element engageable with a second seat;
 a variable force biasing means for applying a force to the pilot plug to urge the first sealing element in a direction toward the first seat; and
 a switch movable between first and second positions for selectively directing supply gas to throttle supply gas inlet in throttle mode and the snap supply gas inlet in snap mode, respectively, wherein supply gas passing through the selected of the throttle and snap supply gas inlets is communicated through the single output gas outlet to the process control component.

2. The pilot assembly of claim 1, wherein in throttle mode the snap supply gas inlet is a vent passage, and in the snap mode the throttle supply gas inlet is a vent passage.

3. The pilot assembly of claim 1 wherein in throttle mode the first sealing element is disengaged from the first seat and the second sealing element is engaged with the second seat when gas is communicated from the throttle supply gas inlet to the output gas outlet, and wherein in snap mode the first sealing element is engaged with the first seat and the second sealing element is disengaged from the second seat when gas is communicated from the snap supply gas inlet to the output gas outlet.

4. The pilot assembly of claim 1, wherein in throttle mode a counteracting force is applied to the biasing means to counteract at least a portion of the force applied by the biasing means to the pilot plug.

5. The pilot assembly of claim 4, further comprising a flexible diaphragm in the pilot body interior, wherein the counteracting force results solely from supply pressure passing through the throttle gas inlet and acting on the diaphragm.

6. The pilot assembly of claim 5, wherein the biasing means comprises first and second springs, and wherein in throttle mode supply gas communicated into the pilot body interior through the throttle supply gas inlet acts on the diaphragm to counteract the force applied by the second spring.

7. The pilot assembly of claim 6, the second seat being defined on a movable actuator disposed in the pilot body.

8. The pilot assembly of claim 1, the force applied by the biasing means being variable between first and second forces applied to the pilot plug.

9. The pilot assembly of claim 8, wherein the force applied by the biasing means is automatically decreased from the second force to the first force when the switch is moved to the first position and supply gas is communicated at a predetermined rate into the pilot body interior through the throttle supply gas inlet.

10. A pilot switch comprising:
a pilot body with first and second supply gas inlets and a single output gas outlet;
a switch for selectively directing supply gas to a selected one of the first and second supply gas inlets, wherein the pilot operates in throttle mode when supply gas is directed to the first gas inlet and in snap mode when supply gas is directed to the second supply gas inlet;
a pilot plug having first and second sealing elements disposed in the pilot body, the first sealing element being engageable with a first seat, the second sealing element being engageable with a second seat, the first seat being positioned between the first supply gas inlet and the output gas outlet, the second seat being positioned between the second output gas inlet and the supply gas outlet; and
a loading mechanism for applying a force to the pilot plug to urge the first sealing element in a direction toward the first seat, the loading mechanism being variable to apply a first force in throttle mode and a second, increased force in snap mode.

11. The pilot switch of claim 10 further comprising an actuator movably disposed in the pilot body for engaging and moving the pilot plug.

12. The pilot switch of claim 11, the second seat being defined on the actuator.

13. The pilot switch of claim 12, wherein movement of the actuator in a first direction will disengage the first sealing element from the first seat and open a pathway from the first supply gas inlet to the output gas outlet, and movement in a second direction will disengage the second sealing element from the second seat and open a pathway from the second supply gas inlet to the output gas outlet.

14. The pilot switch of claim 10 wherein supply gas directed through the first supply gas inlet will cause a counteracting force to be applied to the loading mechanism so that the first force is applied to the pilot plug.

15. The pilot switch of claim 10 wherein the load mechanism maintains the first sealing element in engagement with the first seat when the pilot switch is in snap mode and the supply switch directs supply gas into the second supply gas inlet which is communicated to the output gas outlet.

16. The pilot switch of claim 10 further comprising:
a spring plate positioned in a pilot body interior, the load mechanism comprising a snap spring situated to engage the spring plate and apply a force to the spring plate and a throttle spring in constant engagement with the pilot plug;
a push rod fixed to the spring plate for engaging the first sealing element;
a diaphragm connecting the spring plate to the pilot body, wherein a counteracting force is applied to the snap spring by supply gas pressure acting on the diaphragm to move the spring plate and thereby move the push rod out of engagement with the first sealing ball.

17. The pilot switch of claim 11 further comprising a pair of flexible diaphragms connecting the actuator to the pilot body.

18. The pilot switch of claim 17, the diaphragms being substantially parallel.

19. The pilot switch of claim 17, wherein supply gas communicated through the second supply gas inlet enters the pilot body interior between the pair of flexible diaphragms.

20. A pilot assembly comprising:
a pilot body defining a pilot body interior, the pilot body interior comprising a throttle chamber and a snap chamber;
a pilot plug disposed in the pilot body interior, the pilot plug comprising an upper and a lower sealing ball connected by a pilot plug stem;
an actuator movable in the pilot body interior, the actuator defining a lower seat engageable with the lower sealing ball;
a seat body affixed in the pilot body interior defining an upper seat engageable with the upper sealing ball;
a biasing means for applying a force in a direction to urge the upper sealing ball toward the upper seat;
a throttle supply gas inlet communicated with the throttle chamber;
a snap supply gas inlet communicated with the snap chamber; and
an outlet for communicating the supply gas from a selected one of the throttle supply gas inlet and the snap supply gas inlet to a process control unit, the pilot being switchable between a snap mode and a throttle mode to operate the process control unit wherein in throttle mode the supply gas operates to counteract a portion of the force applied by the biasing means.

21. The pilot assembly of claim 20, further comprising a switch plate for directing supply gas to the selected of the throttle or snap supply gas inlet.

22. The pilot assembly of claim 21, the switch plate being rotatable relative to the pilot body.

* * * * *